United States Patent
Huang et al.

(10) Patent No.: US 8,432,259 B2
(45) Date of Patent: Apr. 30, 2013

(54) PICKING SYSTEM

(75) Inventors: Chun-Hui Huang, Hsinchu (TW);
Hsien-Min Hsu, Hsinchu (TW);
Cheng-Chung Lin, Hsinchu (TW);
Chih-Lung Liu, Hsinchu (TW)

(73) Assignee: Atop Technologies, Inc., Hsinchu (TW)

( * ) Notice: Subject to any disclaimer, the term of this patent is extended or adjusted under 35 U.S.C. 154(b) by 342 days.

(21) Appl. No.: 12/985,762

(22) Filed: Jan. 6, 2011

(65) Prior Publication Data

US 2012/0038466 A1    Feb. 16, 2012

(30) Foreign Application Priority Data

Aug. 13, 2010    (TW) ................ 99215638 U

(51) Int. Cl.
*H04Q 5/22*      (2006.01)
*G05B 23/02*     (2006.01)
*G06Q 10/00*     (2012.01)

(52) U.S. Cl.
USPC ....... 340/10.42; 340/10.5; 340/10.6; 340/3.1; 705/28

(58) Field of Classification Search ............... 340/10.42, 340/10.5, 10.6, 3.1; 705/28
See application file for complete search history.

(56) References Cited

U.S. PATENT DOCUMENTS

| 8,299,890 B2* | 10/2012 | Nagasawa ............... 340/5.2 |
| 2009/0128358 A1* | 5/2009 | Tuval ............... 340/825.49 |
| 2012/0166241 A1* | 6/2012 | Livingston et al. ......... 705/7.12 |

* cited by examiner

*Primary Examiner* — Brian Zimmerman
*Assistant Examiner* — Omeed Alizada
(74) *Attorney, Agent, or Firm* — Muncy, Geissler, Olds & Lowe, PLLC

(57) ABSTRACT

A picking system comprises a radio frequency identification (RFID) tag, a case, a two-wire conductive strip, at least one identifying unit and a processing unit. The two-wire conductive strip is electrically connected between the identifying unit and the processing unit. The identifying unit reads tag information within the RFID tag for actively and instantly controlling the authorization of an operating staff assigned for particular items thereby improving the accuracy of picking items.

17 Claims, 3 Drawing Sheets

PICKING SYSTEM

BACKGROUND OF THE INVENTION

1. Field of the Invention

The present invention relates to a picking system and more especially, relates to a picking system comprising a two-wire conductive strip and a radio frequency identification tag.

2. Description of the Prior Art

In a logistics center, inventory picking is an important operation in order to select items in accordance with customers' orders correctly. Efficiency for the operation of picking inventory is also important. Typically, labels in accordance with different kinds of items are attached to a shelf where items are stored. An operating staff receives an order list from a customer and then proceeds to the shelf and refers to the label to fulfill the picking operation. Conventional labels mainly show the information including the product name and the total quantity of the item. However, mistakes such as picking wrong item, items being picked by incorrect operating staff and placing the product into a wrong order receptacle may occur when a plurality of operating staffs are picking at the same time or each operating staff must fulfill a plurality orders at the same time. Because the conventional picking system may not able to instantly monitor and verify the picking accuracy during picking operation, efficiency may be impeded and also the performance of the operating staff may not be quantified.

SUMMARY OF THE INVENTION

According to the issue mentioned previously, the present invention provides a picking system.

One of objects of this invention is to provide a picking system, which includes a radio frequency identification (RFID) tag and a two-wire conductive strip electrically connected between at least one identifying unit and a processing unit, resulting that the picking system of the present invention is assembly-effective. Tag information stored in the RFID tag may be read by the identifying unit, whereby the authorization of the operating staff assigned for particular items is controlled actively and instantly to improve the accuracy of picking items. The performance of the operating staff may also be evaluated according the result stored in the picking system of the present invention.

The picking system of the present invention comprises a radio frequency identification (RFID) tag, a case, a two-wire conductive strip, at least one identifying unit and a processing unit. The RFID tag is attached to an operating staff and includes tag information. The case comprises a containing space. The two-wire conductive strip is disposed in the containing space. The identifying unit is disposed in the containing space and electrically connected to the two-wire conductive strip, wherein the identifying unit comprises a reading member and a responding member. The reading member is utilized for reading the tag information stored in the RFID tag in a non-contact manner. The responding member is utilized for receiving an identification signal and responding according to the identification signal. The processing unit comprises item information, wherein the processing unit communicates with the identifying unit via the two-wire conductive strip such that the processing unit receives the tag information, read by the reading member, from the identifying unit to identify the relationship between the tag information and the item information and then sends the identification signal to the responding member of the identifying unit.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DETAILED DESCRIPTION OF THE INVENTION

Figure 1:
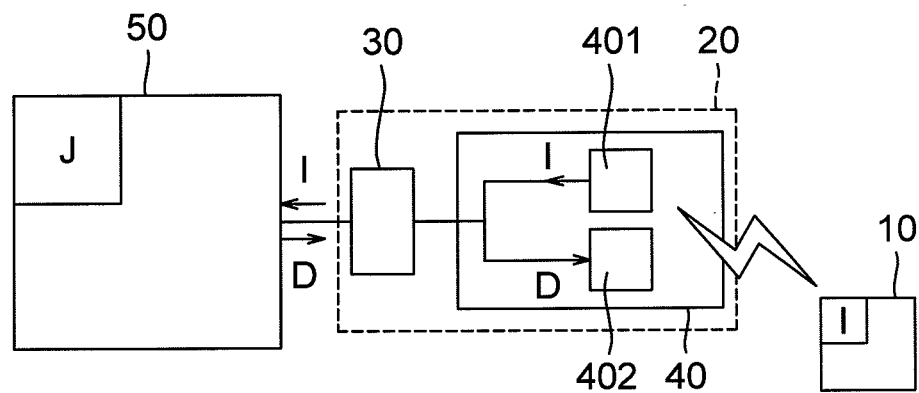
FIG. 1 is a system block diagram in accordance with an embodiment of the picking system of the present invention.
Figure 2:
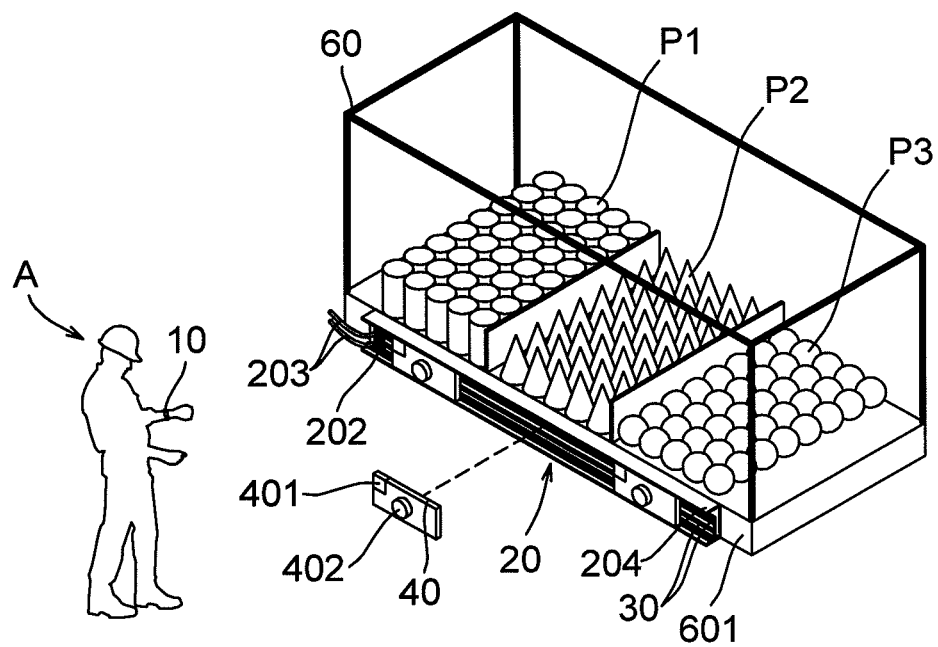
FIG. 2 is a schematic diagram in accordance with the embodiment of the picking system of the present invention.

Referring to FIG. 1 and FIG. 2, FIG. 1 is a block diagram in accordance with an embodiment of the picking system of the present invention; FIG. 2 is a schematic diagram in accordance with the embodiment of the picking system of the present invention. The picking system comprises: a radio frequency identification (RFID) tag 10, a case 20, a two-wire conductive strip 30, at least one identifying unit 40 and a processing unit 50. The case 20 comprises a containing space 204. The two-wire conductive strip 30 comprises two strip-shaped conductive metal lines disposed oppositely to each other in the containing space 204. The identifying unit 40 is disposed in the containing space 204 and electrically connected to the two-wire conductive strip 30. The processing unit 50 may comprise a computer or a device capable of processing or calculating data. The processing unit 50 communicates with the identifying unit 40 via electrically connecting to the two-wire conductive strip 30 and the power for the identifying unit 40 supplied by the processing unit 50 may also be transmitted via the two-wire conductive strip 30.

Referring to FIG. 2, the picking system in accordance with one embodiment of the present invention further comprises a fastening element 202 and at least two conductive wires 203, wherein the fastening element 202 is disposed at one terminal of the containing space 204 for fastening the two-wire conductive strip 30. Two conductive wires 203 are disposed on the fastening element 202. One end of each conductive wire 203 is electrically connected to the two-wire conductive strip 30, and the other end of each conductive wire 203 is electrically connected to the processing unit 50 or another two-wire conductive strip within another containing space.

The RFID tag 10 is attached to an operating staff A and the RFID tag 10 includes tag information I. The tag information I may include the information of the operating staff A, which may be, but not limited to, the name or a code of the operating staff A or the combination thereof. It should be noted that the RFID tag 10 is worn, but not limited to, on the wrist of the operating staff A. It may also be attached on the chest or the waist of the operating staff A.

In an example illustrating how picking operation is conducted, a shelf 60 including at least one product is located in a warehouse, and in the embodiment of the present invention shown in FIG. 2, a plurality of items P1, P2 and P3 are stored on the shelf 60. The case 20 is disposed, but not limited to, on a crossbeam 601 of the shelf 60. The case 20 may be a part of the crossbeam 601 of the shelf 60. The length of the case 20 depends on that of the crossbeam 601; alternatively, the crossbeam 601 may be assembled by a plurality of cases 20. Identifying units 40 are disposed in the containing space 204 of the case 20 in accordance with the location of items P1, P2 and P3 respectively, and each identifying unit 40 is electrically connected to the two-wire conductive strip 30. The identifying unit 40 comprises a reading member 401 and a responding member 402. When the operating staff A proceeds to the shelf 60 to pick product P1, the reading member 401 reads the tag information I stored in the RFID tag 10 in a non-contact manner. The reading member 401 then transmits the tag information I to the processing unit 50 via the two-wire conductive strip 30. It should be understandable that the reading member 401 may be a radio frequency identification (RFID) reader.

Item information J is included in the processing unit 50, wherein the item information J comprises information of a product assigned to a predetermined operating staff. The item information J may comprise a product name, a product code, a quantity desired for a specific product or the combination thereof. The processing unit 50 identifies the relationship between the tag information I and the item information J and then outputs an identification signal D. The responding member 402 of the identifying unit 40 receives the identification signal D and responds accordingly. It should be understandable that the identification signal D includes the result of identifying whether a product is picked by the right operating staff. The responding member 402 comprises a light emitting element, a speaker or the combination thereof and responds according to the identification signal D. The responding member 402 may, for instance, be a light emitting element emitting green light and red light. The responding member 402 emits green light when the operating staff A picks the right item; and emits red light when the operating staff A picks the wrong item.

In another embodiment of the present invention, the responding member 402 may be a valve door or a valve rod. The responding member 402 may be activated to warn the operating staff A of picking the wrong product for controlling the authorization of the operating staff regarding particular items thereby improving the accuracy of picking products. The identifying unit 40 may further comprise a writing member for writing data into the RFID tag 10 in a non-contact manner. For example, the history of what the operating staff A picked may be written into the RFID tag 10 and the result of identifying the relationship between the tag information I and the item information J may be recorded for providing a reference for performance evaluation.

Figure 3:
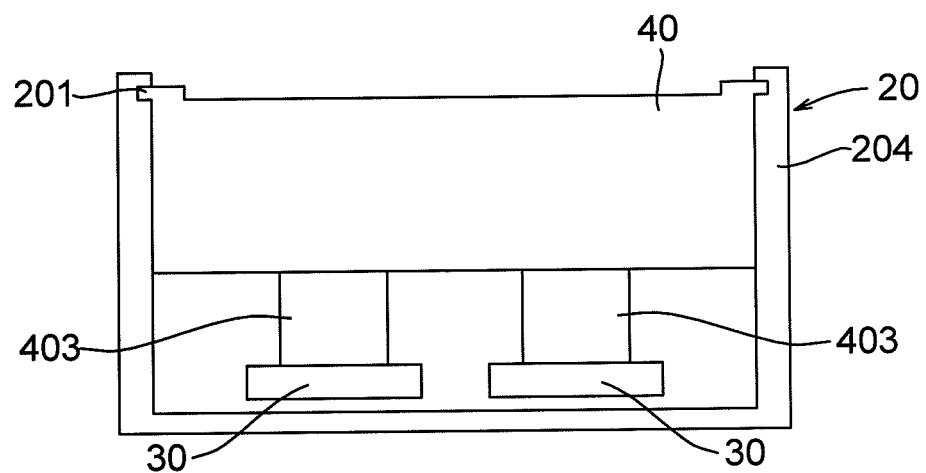
FIG. 3 is a cross section diagram illustrating part of the embodiment of the picking system of the present invention.

It should be noted that the identifying unit 40 may, but not limited to, be electrically connected to the two-wire conductive strip 30 by welding. Preferably, the identifying unit 40 may be magnetically attached to the two-wire conductive strip 30. Please refer to FIG. 3, a cross section diagram illustrating part of an embodiment of the picking system of the present invention. The identifying unit 40 comprises two magnetic connecting members 403, which are magnetically and electrically conductive, and the two-wire conductive strip 30 comprises a stainless steel strip of electrical and magnetic conductivity. Each magnetic connecting member 403 is magnetically attached to and electrically connected to the two-wire conductive strip 30 for the identifying unit 40 to communicate with the processing unit 50. The configuration of the magnetic connecting member 403 makes the identifying unit 40 detachable, and therefore the quantities of the identifying unit 40 can be varied in a convenient and effective manner. In the embodiment of present invention shown in FIG. 3, the case 20 comprises two groove tracks 201 disposed oppositely, wherein each groove track 201 is disposed at an open end of a side wall of the containing space 204 and the groove tracks 201 are engaged with the identifying unit 40. The identifying unit 40 may be moved along the groove tracks 201 to change position according to practical situation. Accordingly, not only the two-wire conductive strip 30 is assembly-effective, but also the identifying unit 40 is not limited by the length of conventional conductive wire so as to increase the flexibility of application.

Figure 4A:
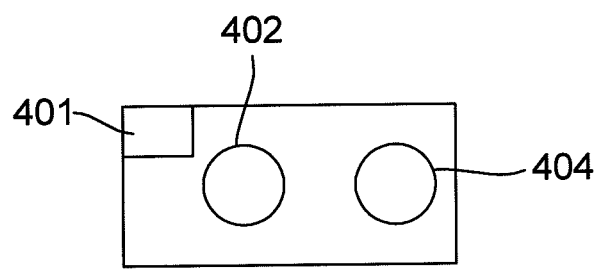
FIG. 4A to 4C are schematic diagrams illustrating different embodiments of the identifying unit of the picking system of the present invention.
Figure 4B:
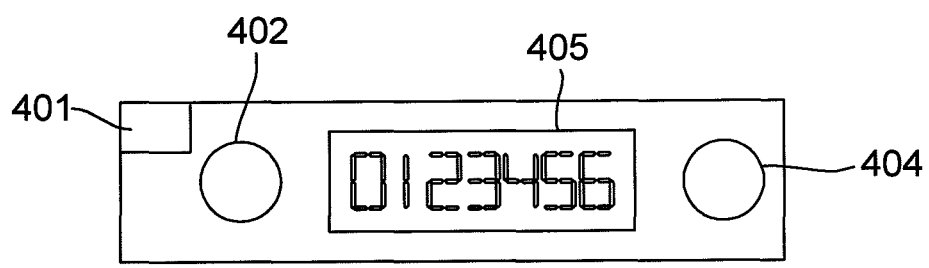
Figure 4C:
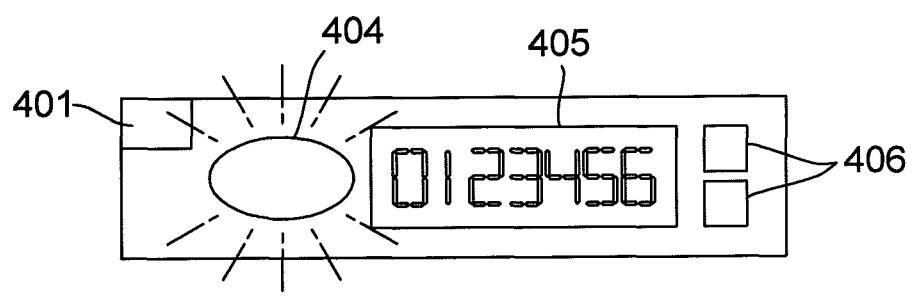

Please refer to FIG. 1, FIG. 4A, FIG. 4B and FIG. 4C, wherein FIG. 4A to 4C are schematic diagrams illustrating different embodiments of the identifying unit of the picking system of the present invention. As shown in FIG. 4A, the identifying unit 40 further comprises an actuating member 404, utilized for actuating the reading member 401 to read the tag information I in the RFID tag 10. The actuating member 404 may comprise a detecting element, such as an infrared detector, configured for detecting the operating staff A wearing the RFID tag 10 within a predetermined range with respect to the identifying unit 40 and actuating the reading member 401 to read the tag information I in the RFID tag 10. Preferably, as shown in FIG. 4A, the actuating member 404 may be a switch button and the reading member 401 is not actuated until the operating staff A presses the switch button, thereby reducing the power consumption.

As shown in FIG. 4B, the identifying unit 40 further comprises a displaying member 405 for displaying the item information J transmitted from the processing unit 50. The displaying member 405 may be a liquid crystal display or a display comprising a plurality of light emitting diodes for displaying letters, numbers, symbols or the combination thereof. Furthermore, the displaying member 405 may also display the tag information I, the identification signal D or the combination thereof. As shown in FIG. 4C, the actuating member 404 may be a light-pervious switch button and the responding member 402 (not shown in FIG. 4C) is disposed within the actuating member 404. The identifying unit 40 further comprises selection buttons 406 for selecting information displayed on the displaying member 405 via pressing the selection buttons 406.

To sum up, the picking system of the present invention includes a radio frequency identification (RFID) tag and a two-wire conductive strip electrically connected between at least one identifying unit and a processing unit, resulting that the picking system of the present invention is assembly-effective. Tag information stored in the RFID tag may be read by the identifying unit, whereby the authorization of the operating staff assigned for particular items is controlled actively and instantly to improve the accuracy of picking items. The performance of the operating staff may also be evaluated according to the result stored in the picking system of the present invention.

Although the present invention has been explained in relation to its preferred embodiment, it is to be understood that other modifications and variation can be made without departing the spirit and scope of the invention as hereafter claimed.

What is claimed is:
1. A picking system comprising:
   a radio frequency identification (RFID) tag, attached to an operating staff and comprising tag information;
   a case, comprising a containing space;
   a two-wire conductive strip, disposed in said containing space;

at least one identifying unit, disposed in said containing space and electrically connected to said two-wire conductive strip, wherein said identifying unit comprises:
a reading member, utilized for reading said tag information stored in said RFID tag in a non-contact manner; and
a responding member, utilized for receiving a signal that includes a result of a product or task being accomplished;
a processing unit, comprising item information;
wherein the item information comprises information of said product or said task assigned to a predetermined said operating staff;
wherein said processing unit communicates with said identifying unit via said two-wire conductive strip such that said processing unit receives said tag information, read by said reading member, from said identifying unit and to compare said task with the said operating staff between said tag information and said item information and then sends said result to said responding member of said identifying unit;
wherein said identifying unit further comprises a display member for displaying said result of said task being accomplished, from said processing unit.

2. The picking system according to claim 1, wherein said identifying unit is magnetically attached to said two-wire conductive strip.

3. The picking system according to claim 1, wherein said identifying unit further comprises an actuating member utilized for actuating said reading member to read said tag information in said RFID tag.

4. The picking system according to claim 3, wherein said actuating member comprises a switch button and said reading member is actuated to read said tag information in said RFID tag when said operating staff presses said switch button.

5. The picking system according to claim 3, wherein said actuating member comprises a detecting element configured for detecting said operating staff wearing said RFID tag (or having said RFID tag attached thereon) within a predetermined range with respect to said identifying unit and actuating said reading member to read said tag information in said RFID tag.

6. The picking system according to claim 5, wherein said detecting element comprises an infrared detector.

7. The picking system according to claim 1, wherein said identifying unit further comprises a displaying member for displaying said item information from said processing unit.

8. The picking system according to claim 7, wherein said displaying member further displays said tag information, said result or the combination thereof.

9. The picking system according to claim 7, wherein said displaying member comprises a liquid crystal display.

10. The picking system according to claim 7, wherein said displaying member comprises a plurality of light emitting diodes.

11. The picking system according to claim 1, wherein said responding member comprises a light emitting element, a speaker or the combination thereof.

12. The picking system according to claim 1, wherein said responding member comprises a valve door or a valve rod.

13. The picking system according to claim 1, wherein said identifying unit further comprises a writing member for writing data into said RFID tag in a non-contact manner.

14. The picking system according to claim 1, wherein said case has two groove tracks disposed at an open end of an opposite side wall of said containing space and engaged with said identifying unit.

15. The picking system according to claim 1, wherein said item information comprises information of a product assigned to said operating staff.

16. The picking system according to claim 1, wherein said item information comprises a product name, a product code, a quantity desired for a specific product or the combination thereof.

17. The picking system according to claim 1, wherein said tag information comprises the name of said operating staff, a code of said operating staff or the combination thereof.

* * * * *